United States Patent
Lawrie et al.

(10) Patent No.: US 9,444,700 B2
(45) Date of Patent: Sep. 13, 2016

(54) NETWORK ANALYSIS DEVICE AND METHOD

(75) Inventors: William Lawrie, Downington, PA (US); Robert Millis, Wilmington, DE (US); Richard Thomas Walsh, Marlton, NJ (US); David Benjamin Lewanda, Cherry Hill, NJ (US)

(73) Assignee: Imagine Communications Corp., Frisco, TX (US)

( * ) Notice: Subject to any disclaimer, the term of this patent is extended or adjusted under 35 U.S.C. 154(b) by 316 days.

(21) Appl. No.: 13/287,593

(22) Filed: Nov. 2, 2011

(65) Prior Publication Data

US 2013/0111014 A1    May 2, 2013

(51) Int. Cl.
| | |
|---|---|
| *G06F 15/173* | (2006.01) |
| *H04L 12/26* | (2006.01) |
| *H04L 12/24* | (2006.01) |
| *H04L 29/08* | (2006.01) |

(52) U.S. Cl.
CPC ............. *H04L 43/026* (2013.01); *H04L 41/22* (2013.01); *H04L 43/06* (2013.01); *H04L 43/12* (2013.01); *H04L 67/22* (2013.01)

(58) Field of Classification Search
CPC ... H04L 1/244; H04L 25/08; H04L 27/2647; H04L 27/3863; H04L 63/1408; H04L 51/00; H04L 51/32; H04L 43/026; H04L 12/14; H04L 41/0893; H04L 41/5003; H04L 41/5025; H04L 43/12; H04L 65/403; H04L 67/04; H04L 43/028; H04L 43/50; H04L 49/555; H04L 43/0823; H04L 43/16; H04L 43/18; H04L 49/351; H04L 63/0227; G06F 17/30867; G06F 13/385; G06F 9/546; G06F 11/0784

USPC ................. 709/224, 225, 230, 231
See application file for complete search history.

(56) References Cited

U.S. PATENT DOCUMENTS

| | | | | |
|---|---|---|---|---|
| 5,664,105 | A * | 9/1997 | Keisling et al. | 709/224 |
| 6,820,225 | B1 * | 11/2004 | Johnson et al. | 714/715 |
| 7,272,605 | B1 * | 9/2007 | Hinshaw et al. | 707/688 |
| 7,546,451 | B1 * | 6/2009 | Cicchetti et al. | 713/100 |
| 2001/0047517 | A1 | 11/2001 | Christopoulos et al. | |
| 2003/0148762 | A1 * | 8/2003 | Noe | 455/423 |

(Continued)

FOREIGN PATENT DOCUMENTS

| | | |
|---|---|---|
| WO | WO 00/31963 A1 | 6/2000 |
| WO | WO 2007/101117 A2 | 9/2007 |

(Continued)

OTHER PUBLICATIONS

Int'Search Report—4 pgs, May 6, 2013, Harris Corporation.

(Continued)

*Primary Examiner* — Brian J Gillis
*Assistant Examiner* — Thao Duong
(74) *Attorney, Agent, or Firm* — Tarolli, Sundheim, Covell, Tummino LLP (57) ABSTRACT

One embodiment of a device includes a network filter configured to filter a plurality of network streams in real-time at the network analysis device to access at least one of the plurality of network streams based on filter parameters input to the network filter. The device further includes a processor configured to compile network information associated with the accessed at least one of the plurality of network streams to allow interaction with the network information.

17 Claims, 4 Drawing Sheets

(56) References Cited

U.S. PATENT DOCUMENTS

| | | | |
|---|---|---|---|
| 2004/0236866 A1* | 11/2004 | Dugatkin et al. | 709/235 |
| 2007/0011317 A1* | 1/2007 | Brandyburg et al. | 709/224 |
| 2007/0011321 A1 | 1/2007 | Huntington et al. | |
| 2007/0160073 A1 | 7/2007 | Toumura et al. | |
| 2008/0240093 A1 | 10/2008 | Morad et al. | |
| 2009/0094630 A1 | 4/2009 | Brown | |
| 2009/0190474 A1 | 7/2009 | Gahm et al. | |
| 2009/0268806 A1 | 10/2009 | Kim et al. | |
| 2010/0031299 A1* | 2/2010 | Harrang et al. | 725/80 |
| 2010/0100775 A1 | 4/2010 | Slutsman et al. | |
| 2011/0093902 A1 | 4/2011 | De Los Reyes et al. | |
| 2012/0265856 A1* | 10/2012 | Major et al. | 709/219 |

FOREIGN PATENT DOCUMENTS

| | | |
|---|---|---|
| WO | WO 2009/097300 A2 | 8/2009 |
| WO | WO 2009/131359 A2 | 10/2009 |

OTHER PUBLICATIONS

Written Opinion of the Int'l Searching Authority—5 pgs, May 6, 2013, Harris Corporation.

* cited by examiner

NETWORK ANALYSIS DEVICE AND METHOD

TECHNICAL FIELD

The present invention relates generally to network systems, and specifically to a network analysis device and method.

BACKGROUND

Network analysis devices can be implemented to maintain a variety of networks. A network analyzer can measure the network parameters of communications networks, such as Internet Protocol television (IPTV) networks. As an example, a network analyzer can monitor and evaluate a switching and/or signaling telecommunication protocol between different nodes in a given network. As another example, a network analyzer can intercept and log traffic passing through a digital network or part of a digital network. As data streams flow across the network, the network analyzer can monitor each packet and decode the packet to analyze its content according to specifications. As the demand for highly-utilized gigabit networks increases, the software processing power of typical network analysis devices, particularly portable network analysis devices, is becoming less capable of reliably performing adequate network analysis. Additionally, hardware-only network analysis solutions are typically challenged to offer the complexity of analysis required for the evolving gigabit networks.

SUMMARY

One embodiment of a device includes a network filter configured to filter a plurality of network streams in real-time at the network analysis device to access at least one of the plurality of network streams based on filter parameters input to the network filter. The device further includes a processor configured to compile network information associated with the accessed at least one of the plurality of network streams to allow interaction with the network information.

Another embodiment includes a method for analyzing data on a network. The method includes accessing characteristic information for each packet of each of a plurality of network streams on the network. The method also includes displaying the list of the plurality of network streams and the respective characteristic information associated with each of the plurality of network streams in real-time. The method further includes filtering the list of the plurality of network streams based on filter parameters provided in response to a user input via a user interface.

Another embodiment includes a portable network analysis device. The device includes a network filter that comprises a stream discovery engine configured to monitor a network and to access characteristic information for each packet of each of a plurality of network streams on the network, and a filter stage configured to filter the plurality of network streams based on filter parameters. The device also includes a user interface configured to display a list of the filtered plurality of network streams on the network based on the compiled characteristic information. Each of the plurality of network streams can be individually selectable to access network information associated with the respective plurality of network streams in real-time.

DETAILED DESCRIPTION

This disclosure relates generally to network systems, and specifically to a network analysis device and method. The network analysis device can be configured as a portable device, such as battery-operated, that is configured to monitor a network, such as a gigabit Internet Protocol television (IPTV) network. The network analysis device includes a network filter that includes a stream discovery engine and a filter stage. The stream discovery engine can be configured to extract characteristic information associated with each packet of each network stream on the network, such that a user of the network analysis device can be provided a list of the network streams on the network on a user interface in real-time. As an example, the characteristic information can include a network address and a network port of each packet of each network stream on the network. The stream discovery engine can also exclude streams based on data rate and/or protocol to search for specific network stream types, such as audio and/or video streams. The user can thus select a given network stream via the user interface for further analysis of the stream.

The filter stage can be configured to selectively filter the network streams on the network. As an example, the user can enter filter parameters via the user interface to restrict the network streams provided to the network analysis device to only those specified via the filter parameters and those intended for the device, itself. Therefore, the network analysis device can provide network information associated with one or more of the filtered streams and/or a selected stream without exceeding the processing capacity of the network analysis device. Furthermore, because the network analysis device can still continue to receive packets while filtering the network, the network analysis device can be remotely accessible and/or configurable via the network.

Figure 1:
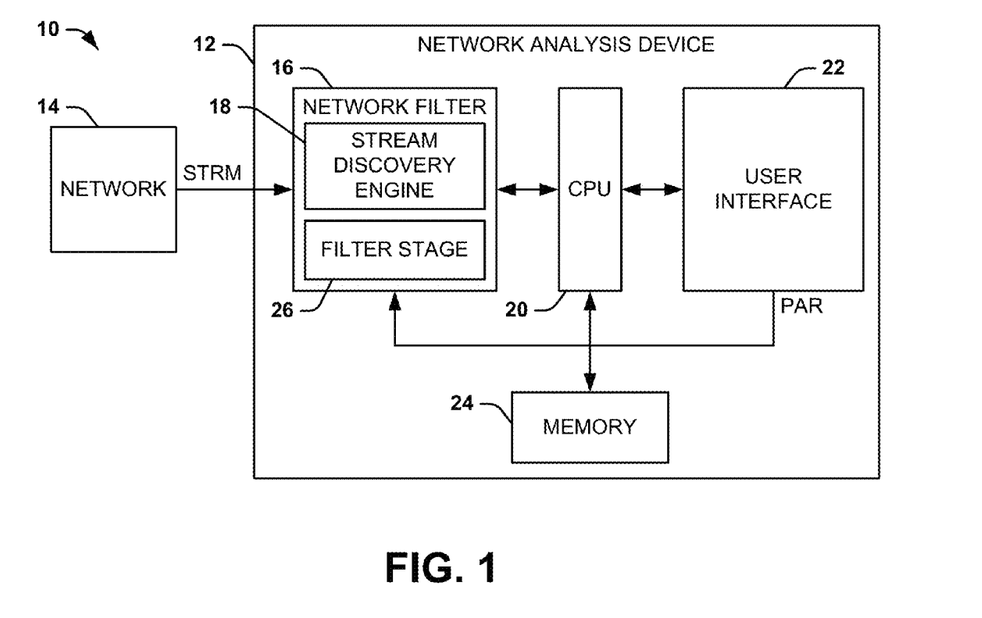
FIG. 1 illustrates an example of a network analysis device in accordance with an aspect of the invention.

FIG. 1 illustrates an example of a network analysis system 10. The network analysis system 10 includes a network analysis device 12 that is configured to analyze network streams, demonstrated in the example of FIG. 1 as a signal STRM, on a network 14. As an example, the network 14 can be a gigabit Internet Protocol television (IPTV) network. The network 14 can be configured as any of a variety of physical media, including a wired network, a wireless network, or an optical network. The network streams STRM can include any of a variety of network stream types, such as real-time transport protocol (RTP) streams or transport streams. In addition, the network streams STRM can include encrypted data, non-encrypted data, or a combination of encrypted and non-encrypted data. The network analysis device 12 can be configured as a portable device or as part of a portable device. Alternatively, the network analysis device 12 can be a peripheral device that can be coupled to a wireless communication device or portable computer. As an example, the network analysis device 12 can be battery operated. As a result, because the network analysis device 12 can be portable, and thus potentially restricted by size constraints, and because the network analysis device 12 can be battery operated, and thus potentially restricted by power constraints, the network analysis device 12 can have a more limited processing capability than a typical commercial network analyzer.

The network analysis device 12 includes a network filter 16 that is configured to monitor each packet of each of the network streams STRM on the network 14. As an example, the network filter 16 can be configured as a hardware component, such as a field-programmable gate array (FPGA) device. However, it is to be understood that one or more of the components described herein can correspond to software or a combination of hardware and software. For example, the network filter 16 can be communicatively coupled to the network 14 to monitor a media access control (MAC) layer of the network 14. However, it is to be understood that the network 14 can be monitored at a variety of network layers above the physical (PHY) layer, such as the IP layer or the data link layer.

The network filter 16 includes a stream discovery engine 18 that is configured to identify and build a list of potential network streams that can be analyzed in greater detail, such as by software or by a user of the network analysis device 12. For example, the stream discovery engine 18 can be configured to ascertain whether each packet satisfies a given predetermined set of packet criteria, such as including a data rate and/or a packet protocol. In response to packets of a given network stream satisfying the packet criteria, the stream discovery engine 18 can save descriptors associated with characteristic information of the packets of the network stream to a memory. As an example, the characteristic information can include at least one of channel name, destination address, and/or port of the respective packets.

The network analysis device 12 also includes a central processing unit (CPU, e.g., processor) 20 that communicates with the network filter 16. The processor 20 can thus compile the characteristic information of the packets of the network streams STRM on the network. For example, the processor 20 can generate a list of the network streams STRM on the network 14 and provide the list on a user interface 22. As an example, the user interface 22 can correspond to a user interface that is dedicated to the network analysis device 12, or can be a user interface on a separate device to which the network analysis device 12 is peripherally coupled, such as a wireless communications device or a tablet computer or portable computer monitor. Therefore, the user interface 22 can demonstrate the list of network streams STRM on the network 14 to a user of the network analysis device 12 in real-time, such that the user interface 22 demonstrates the live network streams STRM as they propagate on the network 14. The list of network streams STRM on the network 14 can also include the characteristic information for the packets of the network streams STRM, such as including a channel name for each of the network streams STRM, the destination address (e.g., an IP address) of each of the packets of the network streams STRM, and/or a port of each of the packets of the network streams STRM.

The user of the network analysis device 12 can interact with the list of the network streams STRM on the network 14 via the user interface 22. For example, the user can scroll through the list of the network streams STRM on the network 14, such as to select a given one of the network streams STRM on the network 14 for further analysis. For instance, the user can select a given one of the network streams STRM on the network 14 for analysis of the network information associated with the given network stream. As another example, the user can record a given one of the network streams STRM, such that a user selected duration of the network stream is saved in a memory 24. For instance, the memory 24 can be configured as any of a variety of memory types, such as flash memory or random-access memory (RAM). As a result, the recorded network stream can be played back by the user at a later time, such as via the user interface 22 or via a different output device. Additionally or alternatively, the recorded network stream may be retrieved remotely in response to a control instruction received from a remote device, such that the saved network stream can be played back via the remote device. In addition, a given one of the network streams STRM can be saved in response to a user input or automatically by the processor 20 to the memory 24, such as via the characteristic information or other identifiers associated with packets of the network stream. As a result, the user can subsequently search for and access the network stream from the network 14 in real-time, such as in the event that the network stream is only intermittently provided on the network 14. For example, the processor 20 can be programmed to periodically poll the network 14 for the saved network stream, and/or the user interface 22 can provide an error message or other indication that a given saved network stream is not currently available on the network 14.

Figure 2:
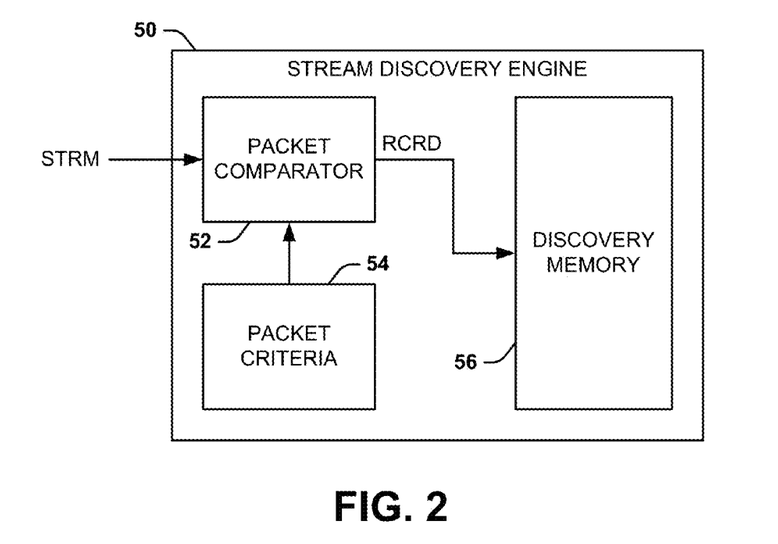
FIG. 2 illustrates an example of a stream discovery engine in accordance with an aspect of the invention.

FIG. 2 illustrates an example of a stream discovery engine 50. The stream discovery engine 50 can correspond to the stream discovery engine 18 in the example of FIG. 1. Therefore, reference is to be made to the example of FIG. 1 in the following description of the example of FIG. 2.

The stream discovery engine 50 includes a packet comparator 52 that is configured to monitor each packet of the network streams STRM that are on the network 14. The packet comparator 52 is further configured to evaluate each of the packets of the network streams STRM with a set of predetermined packet criteria 54. As an example, the predetermined packet criteria 54 can include a data rate threshold and/or a manner of identifying specific types of packet protocols. For example, the data rate threshold and/or the packet protocol criteria can correspond to specific signatures of a packet of the network streams STRM that are associated with specific types of packets, such as packets associated with audio and/or video network streams.

As an example, the packet comparator 52 can include a finite state machine that is configured to analyze the characteristic information of the packets of the network streams STRM individually to determine if the network streams qualify as a desired predetermined type of network stream. The analysis of the characteristic information can be ascertained based on any of a variety of inspection algorithms, such as can identify the characteristic information from packet headers, for analyzing the specific elements of the characteristic information relative to the packet criteria 54. In the example of FIG. 2, the packet criteria 54 are demonstrated diagrammatically as a block that is provided to the packet comparator 52. However, as one example, the packet criteria 54 can be hard-coded into the packet comparator 52, such that it is static. As another example, the packet criteria 54 can be stored in memory, such as the memory 24 in the example of FIG. 1. Therefore, the packet criteria can be dynamically programmable, such as via the user interface 22.

In response to the packets of the network streams STRM satisfying the packet criteria 54, the packet comparator 52 is configured to store the characteristic information of the packets as a record, demonstrated in the example of FIG. 2 as RCRD, in a discovery memory 56. As an example, the discovery memory 56 can be a standalone memory, such as a RAM. As another example, the discovery memory 56 can be part of the memory 24 in the example of FIG. 1. Thus, the discovery memory 56 can store, for example, the destination address and the port of the packets of the network stream STRM. The discovery memory 56 can thus be accessed by the processor 20 to compile a list of the channels that can correspond to the network streams STRM for display and/or interaction on the user interface 22. The saving of the characteristic information in the discovery memory 56 can continue in this manner until the stream discovery engine 50 is disabled, such as via the software of the network analysis device 12 or a user input, or until the discovery memory 56 is full, at which time the user interface 22 can display a message to that effect.

Figure 3:
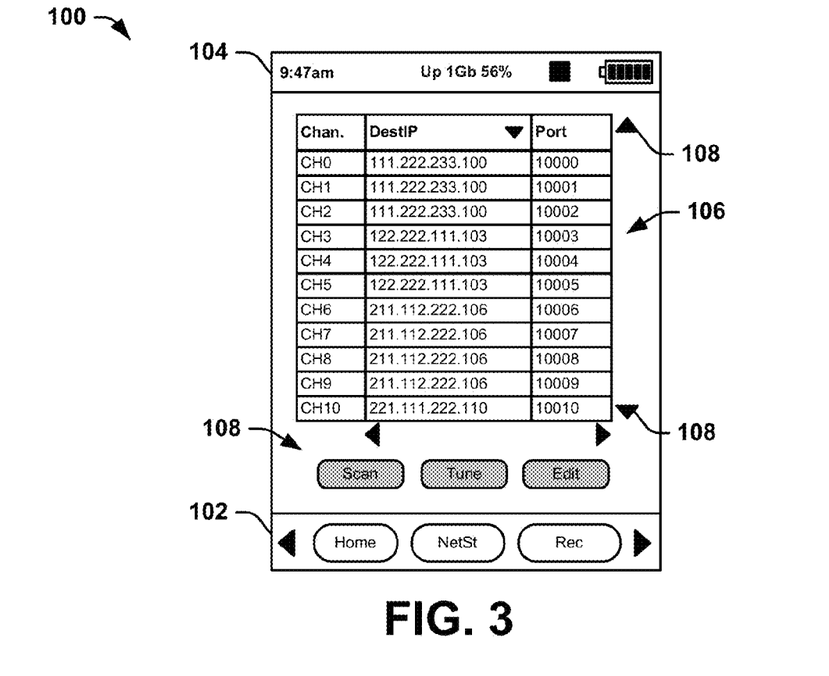
FIG. 3 illustrates another example of a user interface in accordance with an aspect of the invention.

FIG. 3 illustrates another example of a user interface 100. The user interface 100 can correspond to the user interface 22 in the example of FIG. 1. As an example, the user interface 100 can correspond to a local user interface on the network analysis device 12, or can correspond to a user interface or portion of a user interface on a device to which the network analysis device 12 is peripherally attached. Reference can be made to the example of FIGS. 1 and 2 in the following description of the example of FIG. 3.

The user interface 100 can correspond to a screen capture for the user interface 22 of the network analysis device 12. In the example of FIG. 3, the user interface 100 includes user interface control elements 102 that allow the user to control operation of the network analysis device 12. As an example, the user interface control elements 102 can be implemented by a user to navigate menus and perform basic operation and setup of the network analysis device 12. The user interface can also provide general information, demonstrated at 104 as including time, status, and battery life. The user interface 100 can also include a list 106 of channels that correspond to the network streams STRM on the network 14. The list 106 is demonstrated as including channel names, destination IP addresses, and port designations for each of the channels. Therefore, the list 106 can correspond to the list of the network streams STRM on the network 14, as well as the characteristic information, such as based on being accessed and compiled by the processor 20 from the discovery memory 56.

The user interface 100 also includes a set of stream control user interface elements 108 that allow interaction with the channels demonstrated in the list 106 by a user. In the example of FIG. 3, the stream control user interface elements 108 include buttons that allow a user to scroll vertically through the list 106 of channels, as well as buttons to horizontally scroll through additional characteristic information of the corresponding network streams STRM. The stream control user interface elements 108 can also include buttons that allow a user to perform actions on the list 106. In the example of FIG. 3, these buttons of the stream control user interface elements 108 include a button to allow the network analysis device 12 to scan the network 14, such as initially populate the list 106 and/or to refresh the list 106, a button to tune to a specific one of the channels on the list 106, such as to access more detailed network information associated with the respective network stream corresponding to the channel, and a button that allows the user to edit the list 106 and/or a given channel on the list 106, such as to save a given network stream to the memory 24 for subsequent access.

It is to be understood that the user interface 100 is not intended to be limited to the example of FIG. 3. As an example, while the user interface 100 is demonstrated as a touch-screen in the example of FIG. 3, the user interface 100 could instead be configured to include hardware buttons instead of or in addition to a touch-screen interface. As another example, while the channel names are merely demonstrated generically as CH0 through CH10 in the example of FIG. 3, it is to be understood that the list 106 can provide more specific channel names, such as corresponding to corresponding broadcast channels or corresponding names (e.g., from metadata). In addition, the destination IP addresses and the port designations for each channel in the list 106 are demonstrated by example only, and are not intended to correspond to actual destinations on any existing network. Furthermore, the layout of the user interface 100 is demonstrated as but one example, and that the user interface 100 can include controls and/or the list 106 in any of a variety of ways that are suitable to operation by a user.

Referring back to the example of FIG. 1, the network filter 16 also includes a filter stage 26. The filter stage 26 is configured to filter the network streams STRM on the network 14, such that the network analyzer device 12 can narrow the bandwidth of the network 14 to provide a more detailed analysis of a given one or more of the network streams STRM using the somewhat more limited processing power of the network analysis device 12 without data loss. **In the example of FIG. 1, the user can provide filter parameters PAR to the filter stage 26 via the user interface 22, such that the filter stage 26 can filter the network streams STRM based on the filter parameters PAR.

As an example, the filter parameters PAR can include at least one of a channel name, a port, and a destination address of each packet of the network streams STRM. Thus, the list 106 of the channels on the user interface of the example of FIG. 3 corresponding to the network streams STRM can be filtered to demonstrate only a proper subset of all of the network streams STRM on the network 14. As a result, the user of the network analysis device 12 can implement the filter stage 26 to search for specific network streams STRM on the network 14. The user can thus select a given network stream from the filtered list of one or more network streams to access more detailed network information associated with the selected network stream via software and/or the user in real-time.

Figure 4:
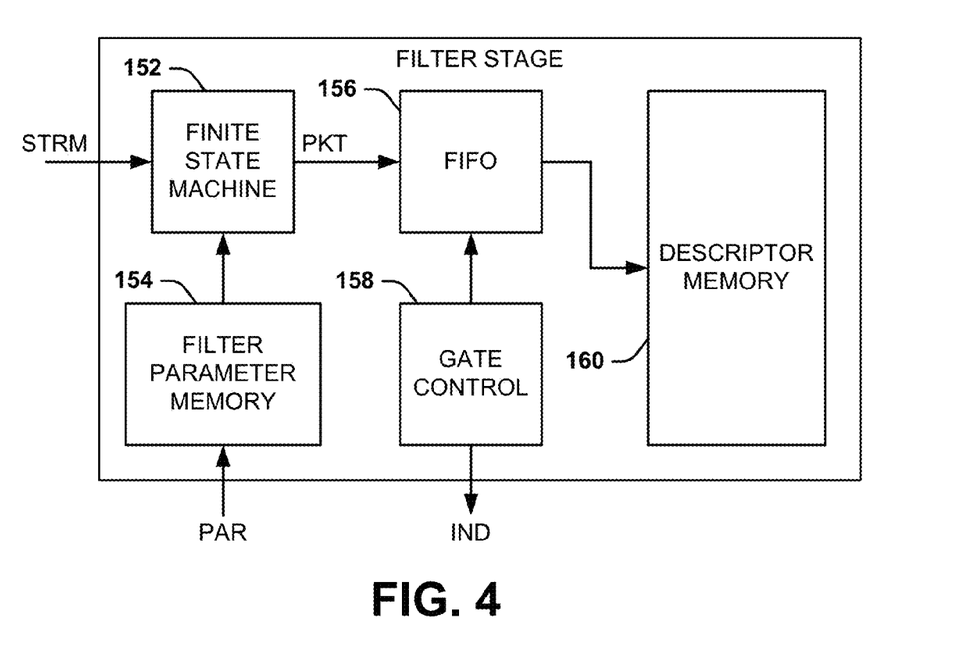
FIG. 4 illustrates an example of a network filter in accordance with an aspect of the invention.

FIG. 4 illustrates an example of a filter stage 150. The filter stage 150 can correspond to the filter stage 26 in the example of FIG. 1. Therefore, reference is to be made to the example of FIG. 1 in the following description of the example of FIG. 4.

The filter stage 150 can include a finite state machine 152 that is configured to monitor the network streams STRM on the network 14. The finite state machine 152 is configured to evaluate each packet of each of the network streams STRM relative to filter parameters that are provided via a signal PAR from the user interface 22 and which are stored in a filter parameter memory 154. As an example, the filter parameter memory 154 can be a standalone memory or can be a portion of the memory 24. The filter parameters PAR can be associated with a variety of parameters in the packets of the network streams STRM, such as can be found in a header of the packets. For example, the filter parameters PAR can be associated with a channel name of the network streams STRM, the destination address of the packets, and/or the port designation of the packets of the network streams STRM. The user interface 22 can be configured in a manner to allow the user to selectively enter one of more of the filter parameters PAR, such that the finite state machine 152 can access only the network streams STRM corresponding to the selected set of filter parameters PAR, as well as packets addressed specifically to the network analysis device 12. Furthermore, the filter parameters PAR could correspond to a specific network stream that is selected by the user from the list 106 via the user interface 22, such as provided by the stream discovery engine 50.

The network streams STRM that are accessible from the network 14 based on the filter parameters PAR are saved in a first-in-first-out (FIFO) memory 156 on a packet-by-packet basis, demonstrated in the example of FIG. 4 by a signal PKT. The FIFO memory 156 can thus maintain the packets of the filtered network streams STRM for access by the processor 20, such as for higher-end processing and/or analysis of the respective packets in approximate real-time. However, because the network analysis device 12 can be configured as a portable device, and thus may have limited processing capability, the packets that are stored in the FIFO memory 156 may have an associated data rate that is greater than can be managed by the processor 20.

In the example of FIG. 4, the filter stage 150 includes a gate control component 158. The gate control component 158 can be configured to validate each of the packets of the filtered network streams STRM that are saved within the FIFO memory 156. The validation of the packets can be based on a data rate, such that the packets that do not exceed a predetermined data rate associated with the processor 20 of the network analysis device 12 can be validated, and thus analyzed and/or processed by the processor 20. For example, the gate control component 158 can be configured to sample received byte counters to determine the bit rates of each of the packets as they are stored in the FIFO memory 156. In addition, the gate control component 158 can also be configured to validate the packets to ensure that the header and the payload of the packets have an expected format. Furthermore, the gate control component 158 can be configured to validate the packets based on a variety of other parameters, such as may be programmed by a user via the user interface 22 and/or remotely.

Upon determining that the packets are not validated, such as based on the bit rate of the given network stream exceeding an acceptable bit rate for the processor 20, the user interface 22 can provide an indication to the user that the respective network stream cannot be reliably analyzed and/or processed based on the capabilities of the processor 20. The non-validated packets can thus be discarded from the FIFO memory 156. As a result, by implementing the gate control component 158, a user can invoke the filter stage 150 to search for or select a given network stream and access the characteristic information of the network stream to determine if higher-level processing or analysis can be accurately be performed prior to attempting to perform such higher-level processing or analysis.

Upon validation of the packets of the filtered network streams STRM in the FIFO memory 156, such that the data rates and/or the packet formats of the filtered network streams STRM are acceptable for processing by the processor 20, the gate control component 158 commands storage of descriptor information within a descriptor memory 160. As an example, the processor 20 can extract the descriptor information from the validated packets to store the descriptor information in the descriptor memory 160. The descriptor memory 160 can be configured as any of a variety of memory types, such as a RAM, or can be a portion of the memory 24. The descriptor memory 160 can thus store information associated with a size and location of the respective packets in the FIFO memory 156. As a result, the processor 20 can access the packets from the FIFO memory 156 for higher-level processing and/or analysis based on the information stored in the descriptor memory 160.

It is to be understood that, in addition to the filter stage 150 receiving the packets that are specified based on the filter parameters PAR provided by the user, such as via the user interface 22, the filter stage 150 can also allow the network analysis device 12 to continue to receive packets on the network 14 that are addressed specifically to the network analysis device 12. As a result, the network analysis device 12 can be remotely accessible via the network 14. As an example, the network analysis device 12 can be remotely configurable, such that a user interface from a remote device can provide configuration commands, such as the filter parameters PAR, to the network analysis device 12 in place of or in addition to commands provided via the user interface 22. As another example, the network analysis information that can be displayed on the user interface can also be transmitted from the network analysis device 12 to the remote device via the network 14 or other communication means, such that packets addressed to the network analysis device 12 via the network 14 can be handshaking packets or any of a variety of other communications. Such communications for remote configuration and/or transmission of network information to and from the network analysis device 12 can likewise occur in substantial real-time, such that the remote configuration and/or transmission of network information can be based on packets that are received by the filter stage 150 in real-time.

Figure 5:
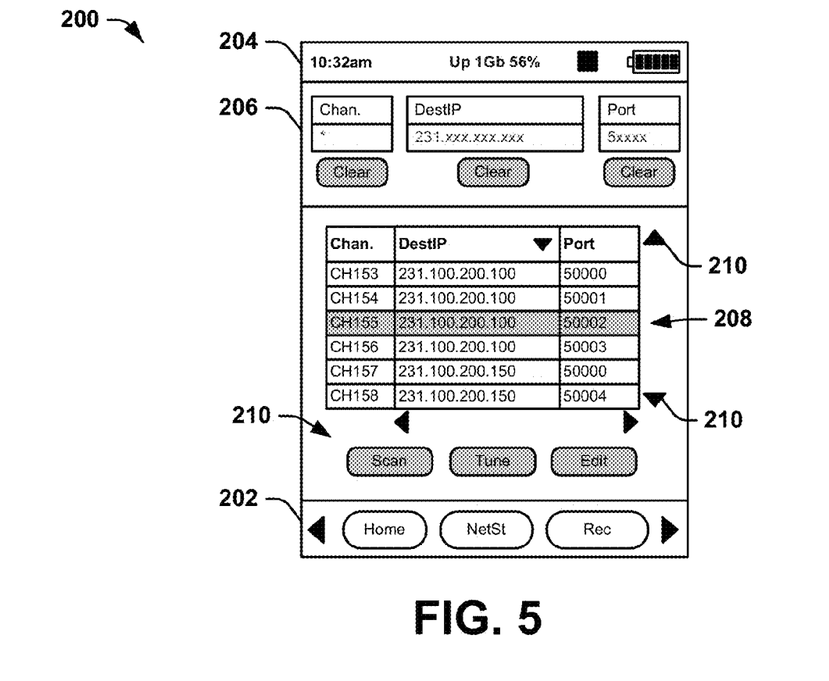
FIG. 5 illustrates another example of a user interface in accordance with an aspect of the invention.

FIG. 5 illustrates another example of a user interface 200. The user interface 200 can correspond to the user interface 22 in the example of FIG. 1, and/or can correspond to a separate screen or control function as the user interface 100 in the example of FIG. 3. As an example, the user interface 200 can correspond to a local user interface on the network analysis device 12, or can correspond to a user interface or portion of a user interface on a device to which the network analysis device 12 is peripherally attached. Reference is to be made to the example of FIGS. 1 through 4 in the following description of the example of FIG. 5.

The user interface 200 can correspond to a screen capture for the user interface 22 of the network analysis device 12. In the example of FIG. 5, the user interface 200 includes user interface control elements 202 that allow the user to control operation of the network analysis device 12. As an example, the user interface control elements 202 can be implemented by a user to navigate menus and perform basic operation and setup of the network analysis device 12. The user interface also includes general information, demonstrated at 104 as including time, status, and battery life.

The user interface 200 also includes a filter parameter input section 206. The filter parameter input section 206 allows the user to input the filter parameters PAR to filter the list 106 of channels, such as provided via the stream discovery engine 18, or to search for specific network streams STRM. In the example of FIG. 5, the filter parameters PAR include channel name, destination address (i.e., destination IP address), and port designation. In the example of FIG. 5, the user has specified a network number of "231" and a leading port digit of "5". The "x" characters in each of the destination IP and port designation fields can be entered by the user to designate "don't care" fields. Therefore, in the example of FIG. 5, the filter stage 150 can access all packets having an IP address beginning with "231" and having a port beginning with "5". The user interface 200 also demonstrates a filtered list 208 of channels that correspond to the filtered network streams STRM on the network 14. The filtered list 208 demonstrates the channel names, destination IP addresses, and port designations for each of the respective channels. Therefore, the list 208 can correspond to a portion of the network streams STRM on the network 14 that are specified by the user. Furthermore, similar to the example of FIG. 3, the user interface 200 also includes a set of controls 210 that allow interaction with the channels demonstrated in the list 208 by a user, such as selection of a given one of the channels for more detailed analysis and/or higher-level processing.

Figure 6:
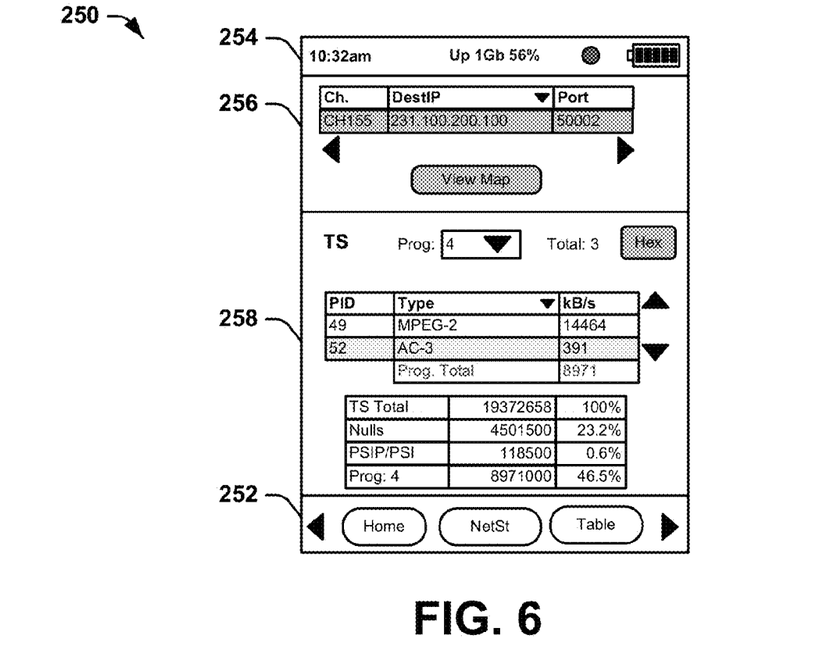
FIG. 6 illustrates yet another example of a user interface in accordance with an aspect of the invention.

FIG. 6 illustrates yet another example of a user interface 250. The user interface 250 can correspond to the user interface 22 in the example of FIG. 1, and/or can correspond to a separate screen or control function as the user interface 100 or the user interface 200 in the example of FIGS. 3 and 5, respectively. Reference is to be made to the example of FIGS. 1 through 5 in the following description of the example of FIG. 6.

The user interface 250 can correspond to a screen capture for the user interface 22 of the network analysis device 12. In the example of FIG. 6, the user interface 250 includes user interface control elements 252 that allow the user to control operation of the network analysis device 12. As an example, the user interface control elements 252 can be implemented by a user to navigate menus and perform basic operation and setup of the network analysis device 12. The user interface also includes general information, demonstrated at 254 as including time, status, and battery life.

The user interface 250 also includes a selection display 256 that specifies a selected one of the network streams STRM on the network 14. The selected network stream in the selection display 256 is demonstrated as including the associated characteristic information (i.e., channel name, destination address, and port designation). As an example, the respective network stream could have been selected from the list 106 in the example of FIG. 3 or the list 208 in the example of FIG. 5. The user interface 250 further includes a stream interaction menu 258 that demonstrates high-level network information associated with the selected network stream. As an example, the high-level network information can be information obtained via the processor 20 processing the packets in the FIFO memory 156. As a result, the user and/or the software of the network analysis device 12 can interact with the high-level network information in the stream interaction menu 258, such as to analyze the network stream that is demonstrated in the selection display 256 as selected by the user.

Figure 7:
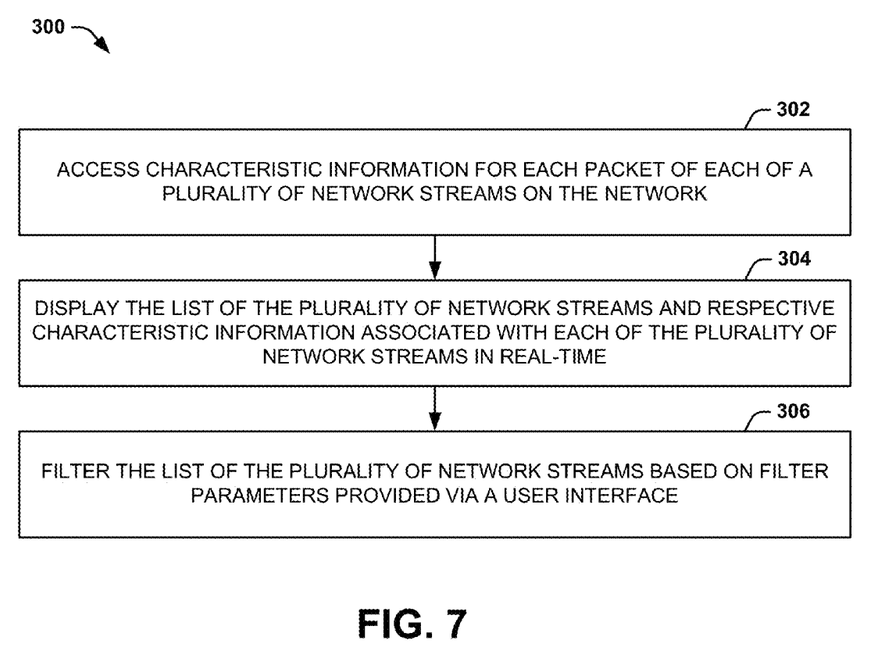
FIG. 7 illustrates an example of method for analyzing data on a network in accordance with an aspect of the invention.

In view of the foregoing structural and functional features described above, an example method will be better appreciated with reference to FIG. 7. While, for purposes of simplicity of explanation, the method of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method.

FIG. 7 illustrates another example of a method 300 method for analyzing data on a network. At 302, characteristic information is accessed for each packet of each of a plurality of network streams on the network. The characteristic information can include information obtained from packet headers by a stream discovery engine of a network filter (e.g., the network filter 16 in the example of FIG. 1). The characteristic information can include channel name, destination address, and/or port designation. At 304, the list of the plurality of network streams and the respective characteristic information associated with each of the plurality of network streams is displayed in real-time. The list can be compiled by the processor and displayed on a user interface (e.g., the user interface 22 in the example of FIG. 1) with which a user can interact. The user can select a given one of the network streams to obtain further analysis and/or processing of the network stream.

At 306, the list of the plurality of network streams is filtered based on filter parameters provided via a user interface. The filtering can be based on implementation of a filter stage (e.g., the filter stage 26 in the example of FIG. 1) of the network filter. The filter parameters can correspond to channel name, destination address, and/or port designation of the packets of the network streams. As a result, the user can narrow the list of the network streams on the network and/or search for specific network streams in a manner that narrows the bandwidth of the network to that which is manageable for the associated network analysis device, which can be a portable electronic device having a more limited processing power. The filter stage can implement gate control to ensure that the data rate of the filtered network streams is acceptable for processing by the associated processor, and can store descriptor information in a memory for access of the packets from a FIFO memory. Accordingly, the packets can be processed by the processor for interaction by the user with the network information associated with the network streams.

What has been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A network analysis device comprising:
   a network filter comprising:
      a packet comparator configured to:
         monitor each packet of a plurality of network streams to determine characteristic information corresponding to a network address and a network port of each of the plurality of network streams; and
         store the characteristic information of each network stream of the plurality of network streams in a first memory of the network filter which is accessible by a given processor of the network analysis device, to generate a list of channels corresponding to the plurality of network streams based on the characteristic information stored therein; and a filter stage configured to:
  filter the plurality of network streams in real-time at the network filter to store packets of at least one of the plurality of network streams in a second memory of the network filter based on filter parameters input to the network filter and the stored characteristic information;
  validate packets of at least one of the plurality of network streams stored in the second memory based on a data rate thereof with respect to a processing capability of the given processor;
  store descriptor information in a third memory of the network filter to enable the given processor to access the validated packets stored in the second memory and exclude non-validated other plurality of network streams from being accessed by the given processor of the network analysis device, wherein the given processor is configured to access the packets from the second memory based on the descriptor information to enable interaction with the network streams.

2. The device of claim 1, further comprising a user interface configured to receive user inputs corresponding to the filter parameters for the plurality of network streams on the network, wherein the given processor is configured to provide the network information to the user interface to allow user interaction with the network information in real-time.

3. The device of claim 2, wherein the user interface is further configured to display a list of the plurality of network streams on the network and to allow a given one of the accessed at least one of the plurality of network streams to be selected from the list of the plurality of network streams to access the respective network information in real-time.

4. The device of claim 2, wherein the user interface is configured to save the characteristic information associated with a given one of the plurality of network streams to the first memory in response to a user input, such that the given one of the plurality of network streams is selectable from a list of saved network streams to access the given one of the plurality of network streams at a subsequent time based on the saved characteristic information.

5. The device of claim 1, wherein the filter parameters comprise at least one of a channel name, a port, and a destination address of each packet associated with each of the plurality of network streams.

6. The device of claim 1, wherein the network filter is further configured to allow packets addressed to the network analysis device to be received by the network analysis device, such that the network analysis device is remotely accessible to at least one of access the network information associated with the accessed at least one of the plurality of network streams and provide inputs to the network analysis device.

7. The device of claim 1, wherein the given processor is configured to compile network information associated with the plurality of network streams into a filtered list.

8. The device of claim 7, wherein the descriptor information associated with each validated packet of the filtered list of the plurality of network streams is stored in the third memory in response to determining that a given network stream has an acceptable data rate associated with the network analysis device, and the given network stream is discarded from the second memory prior to performing further processing by the processor if the given network stream exceeds the acceptable data rate.

9. The device of claim 1, wherein the network filter further comprises a stream discovery engine configured to access the characteristic information corresponding to the network address and the network port and to save the network address and the network port of each of packet of the plurality of network streams in the first memory, the processor accessing the network port and the network address of each of the plurality of network streams from the first memory.

10. The device of claim 9, wherein the stream discovery engine is configured to access the characteristic information of each packet of the plurality of network streams that satisfies a predetermined minimum packet size requirement and a predetermined packet protocol requirement.

11. The device of claim 1, wherein the network analysis device is one of a standalone portable electronic device and peripherally coupled to a portable electronic device.

12. A method for analyzing data on a network, the method comprising:
  accessing characteristic information for each packet of each of a plurality of network streams on the network;
  storing the characteristic information of each network stream of the plurality of network streams in a first memory of the network filter, which is accessible by a given processor of the network analysis device to generate a list of channels corresponding to the plurality of network streams based on the characteristic information stored therein;
  displaying a list of the plurality of network streams and the respective characteristic information associated with each of the plurality of network streams in real-time; and
  filtering the list of the plurality of network streams to store packets of at least one of the plurality of network streams in a second memory of the network filter and to provide a corresponding filtered list of network streams based on filter parameters provided in response to a user input;
  validating each packet of the filtered list of the plurality of network streams based on a data rate of each respective packet of the filtered list of the plurality of network streams with respect to a processing capability of the given processor;
  storing descriptor information associated with each validated packet of the filtered list of the plurality of network streams in a third memory to enable the given processor to access the validated packets stored in the second memory;
  indicating that a given network stream is non-validated if the given network stream exceeds an acceptable data rate,
  wherein the filtered list of network streams is limited to a subset of the plurality of network streams that are acceptable for processing relative to a bit rate processing capability of an associated processor based on the bit rate of the network streams identified in the filtered list of network streams; and
  storing data from at least one stream of the subset of the plurality of network streams in another memory for processing.

13. The method of claim 12, further comprising accessing and displaying network information associated with one of the respective plurality of network streams in response to selection of the respective one of the respective plurality of network streams via a user interface.

14. The method of claim 12, wherein filtering the list of the plurality of network streams comprises filtering the list of the plurality of network streams based on at least one of a channel name, a port, and a destination address of each packet associated with each of the plurality of network streams.

15. The method of claim 12, further comprising:
saving characteristic information associated with a given one of the plurality of network streams in the first memory; and
accessing the given one of the plurality of network streams from a list of saved network streams from the first memory.

16. A portable network analysis device comprising:
a network filter comprising:
  a stream discovery engine comprising a packet comparator and a first memory, the stream discovery engine being configured to:
    monitor a network;
    access characteristic information corresponding to a network address and a network port of each of the plurality of network streams for each packet of each of a plurality of network streams on the network; and
    store the characteristic information in the first memory of the network filter, which is accessible by a given processor of the network analysis device to generate a list of channels corresponding to the plurality of network streams based on the characteristic information stored therein; and
  a filter stage configured to filter the plurality of network streams based on filter parameters, the stored characteristic information and a bit rate processing capability of the network analysis device, the filter stage comprising a gate control component configured to validate each packet of the list of the filtered plurality of network streams based on a data rate of each respective packet of the list of the filtered plurality of network streams, the gate control component being further configured to store descriptor information associated with each validated packet of the list of the filtered plurality of network streams in a second memory; and
a user interface configured to display a list of the filtered plurality of network streams on the network based on the characteristic information, each of the plurality of network streams being individually selectable to access network information associated with the respective plurality of network streams in real-time, wherein the user interface is configured to record a given one of the plurality of network streams such that a user selected duration of the given one of the plurality of network streams, including packets thereof, is stored in a third memory for processing by a processor, and wherein the user interface is configured to provide an indication that a given network stream exceeds an acceptable data rate of the network analysis device.

17. The device of claim 16, wherein the user interface is configured to save the characteristic information associated with a given one of the plurality of network streams to the third memory in response to a user input, such that the given one of the plurality of network streams is selectable from a list of saved network streams to access the given one of the plurality of network streams at a subsequent time based on the saved characteristic information.

* * * * *